United States Patent
Jones

(10) Patent No.: US 10,677,056 B2
(45) Date of Patent: Jun. 9, 2020

(54) CONCRETE

(71) Applicant: C-PROBE SYSTEMS LIMITED, St. Helens (GB)

(72) Inventor: Graeme Jones, St. Helens (GB)

(73) Assignee: C-Probe Systems Limited, St. Helens, Merseyside (GB)

( * ) Notice: Subject to any disclaimer, the term of this patent is extended or adjusted under 35 U.S.C. 154(b) by 107 days.

(21) Appl. No.: 15/550,708

(22) PCT Filed: Feb. 12, 2016

(86) PCT No.: PCT/GB2016/050349
§ 371 (c)(1),
(2) Date: Aug. 11, 2017

(87) PCT Pub. No.: WO2016/128768
PCT Pub. Date: Aug. 18, 2016

(65) Prior Publication Data
US 2018/0058217 A1    Mar. 1, 2018

(30) Foreign Application Priority Data
Feb. 12, 2015 (GB) .................................. 1502356.7

(51) Int. Cl.
*E21D 11/08* (2006.01)
*C04B 14/38* (2006.01)
(Continued)

(52) U.S. Cl.
CPC .......... *E21D 11/086* (2016.01); *C04B 14/386* (2013.01); *C04B 28/006* (2013.01); *C04B 28/04* (2013.01); *C04B 2111/00724* (2013.01); *C04B 2111/20* (2013.01); *C04B 2111/24* (2013.01); *C04B 2111/265* (2013.01); *C04B 2111/27* (2013.01); *C04B 2111/28* (2013.01); *C04B 2111/72* (2013.01); *C04B 2111/723* (2013.01); *E01F 5/005* (2013.01); *Y02P 40/165* (2015.11)

(58) Field of Classification Search
USPC ...................................... 156/71, 94
See application file for complete search history.

(56) References Cited

U.S. PATENT DOCUMENTS 5,798,307 A    8/1998 Davidovits et al.
2013/0305642 A1*  11/2013 Propst ...................... E04D 1/28
52/309.3

FOREIGN PATENT DOCUMENTS

| EP | 2873656 A1 | 5/2015 |
| WO | 03/040054 A1 | 5/2003 |
| WO | 2011029149 A1 | 3/2011 |

OTHER PUBLICATIONS

P. Balaguru, et al. "Geopolymer for Repair and Rehabilitation of Reinforced Concrete Beams," Geopolymer Institute, 1997, pp. 1-6.
(Continued)

*Primary Examiner* — Sing P Chan
(74) *Attorney, Agent, or Firm* — Quarles & Brady LLP

(57) ABSTRACT

Concrete is formed by providing a wet layer of a first concrete 4, applying a second wet layer 6 of concrete on the first layer 4 of wet concrete and setting the layers 4 and 6 to provide a composite concrete structure, wherein at least one of the layers comprises, AACM (Alkali-Activated Cementitious Material). An ionic bond 2 is formed between the two layers. The AACM layer may comprise a reinforcement structure and cathodic protection.

19 Claims, 4 Drawing Sheets

(51) Int. Cl.
*C04B 28/04* (2006.01)
*C04B 28/00* (2006.01)
*E01F 5/00* (2006.01)
*C04B 32/02* (2006.01)
*C04B 111/26* (2006.01)
*C04B 111/00* (2006.01)
*C04B 111/72* (2006.01)
*C04B 111/20* (2006.01)
*C04B 111/24* (2006.01)
*C04B 111/27* (2006.01)
*C04B 111/28* (2006.01)

(56) References Cited

OTHER PUBLICATIONS

International Search Report issued in International Application PCT/GB2016/050349, dated Jun. 1, 2016, 4 pages.

\* cited by examiner

Potential, mVCSE

| Line | BASE | ON | ON | ON | ON | IO | OFF | OFF |
|---|---|---|---|---|---|---|---|---|
| 1 | -0.316 | -0.429 | -0.425 | -0.437 | -0.444 | -0.434 | -0.409 | -0.381 |
| 2 | -0.339 | -0.625 | -0.629 | -0.654 | -0.67 | -0.641 | -0.542 | -0.509 |
| 3 | -0.417 | -1.446 | -1.288 | -1.466 | -1.279 | -1.02 | -0.779 | -0.763 |
| 4 | -0.384 | -1.276 | -1.247 | -1.267 | -1.261 | -1.011 | -0.868 | -0.849 |
| 5 | -0.422 | -0.727 | -0.828 | -0.841 | -0.849 | -0.822 | -0.667 | -0.641 |
| 6 | -0.251 | -0.375 | -0.373 | -0.414 | -0.388 | -0.367 | -0.346 | -0.365 |
| 7 | -0.238 | -0.308 | -0.281 | -0.315 | -0.311 | -0.296 | -0.285 | -0.281 |
| 8 | -0.202 | -0.261 | -0.26 | -0.26 | -0.263 | -0.241 | -0.23 | -0.226 |
| 9 | -0.199 | -0.255 | -0.247 | -0.25 | -0.249 | -0.232 | -0.219 | -0.218 |
| 10 | -0.198 | -0.249 | -0.263 | -0.25 | -0.253 | -0.245 | -0.223 | -0.221 |

Fig. 3a

CONCRETE

CROSS-REFERENCE TO RELATED APPLICATIONS

This application represents the U.S. National Stage of International Application No. PCT/GB2016/050349, filed Feb. 12, 2016 which claims priority from GB Patent Application No. 1502356.7, filed Feb. 12, 2015. The contents of these applications are hereby incorporated by reference as if set forth in their entirety herein.

The present invention relates to concrete elements and the manufacture and repair thereof.

Structures such as, for example, tunnels, culverts etc. are assembled on site from segments of precast concrete. Traditionally ordinary Portland cement (OPC) is used in the manufacture of the concrete segments. This has the advantage of being a relatively inexpensive material. Underground structures are at risk of water ingress fire, corrosion and chemicals, therefore the surface of the concrete is prone to deterioration over time which could give rise to structural problems. This is especially true in the case of reinforced concrete.

It is known to line a tunnel by providing sheet membranes over the surface of the concrete. However, membranes are unable to accommodate complex shapes and can tear easily, thereby enabling water ingress. To alleviate this coating methods have been developed, whereby a coating with the required properties is applied to the exposed surfaces of the concrete, after the precast segments have been assembled. By this means a sprayed or painted coating can be applied to a tunnel's interior, to provide a protective lining on the concrete to prolong its life.

The membrane lining and the lining in the form of a coating each have the disadvantage that they are applied on site, thereby adding to the construction time and costs. Also, surface preparation is required including cleaning to remove dust and oil, priming and then application of one or more coats of the coating. Furthermore, coating materials may be hazardous to apply due to fumes produced. Also, the transporting of linings, coating formulations, their storage, and the subsequent disposal of waste/unused products further adds to the costs.

AACM (Alkali-Activated Cementitious Material) cements which include, but are not limited to geopolymer (Alkali-activated alumina-silicate) cements have been developed which can be used as a replacement for OPC in product formulations to produce, for example, geopolymer concrete which has the benefit of a ceramic, but with the versatility of ordinary concrete. Geopolymer can therefore be used as a material build. It has been shown to demonstrate superior properties to OPC concrete, for example lower moisture ingress, low temperature setting and greater fire resistance. It is an object of the present invention to provide an improved concrete structural element which overcomes or alleviates the above described disadvantages drawbacks.

In accordance with a first aspect of the present invention there is provided a method of construction of a concrete element comprising the steps of providing a first wet concrete layer, providing a second wet concrete layer on the first wet concrete layer, and setting the first and second layers of concrete to bond the first layer of concrete to the second layer of concrete to produce a set, composite concrete element, wherein at least one of the first and second concrete layers comprises an AACM cement (Alkali-Activated Cementitious Material).

The first and second concrete layers may comprise different concretes. In a preferred embodiment the AACM cement includes at least one geopolymer cement. The two layers may be integrally joined by an ionic bond.

The AACM concrete layer may provide a coating or lining to the other concrete layer. In a preferred embodiment the other concrete layer comprises an ordinary Portland cement (OPC).

The method may involve adding at least one of a reinforcement structure and carbon fibres to at least one of the wet concretes. In a preferred embodiment the at least one added reinforcement structure and carbon fibres is in the AACM layer. The provision of carbon fibres adds technical properties to the finished product, including the ability to pass current as an impressed current cathodic protection system for long term corrosion prevention, but also reduces or eliminates the risk of shrinkage or cracking.

The method may include the step of preselecting the ingredients of at least one concrete mix to preselect the characteristics of the finished concrete element.

In a preferred embodiment the characteristics of the AACM concrete layer is preselected to provide a layer with at least one of the required characteristics of degree of resistance to water ingress, fire resistance, chemical resistance, salt ingress resistance and mechanical resistance.

The method may include the step of at least one of adjusting the time between adding the second layer to the first layer, and the time and conditions enabling the two wet concrete layers to set and bond.

Applying an AAMC layer as a wet-on-wet process on top of a different concrete layer enables selection of concretes with different properties, this can be in the form of a pre-cast element, or an in-situ repair, to enhance the protection and strengthening of structures and improving or providing cathodic protection.

In a preferred embodiment the concrete element is precast using a mould wherein the steps of providing includes pouring the first wet concrete layer in the mould, then pouring the second wet concrete layer in the mould on top of the first wet concrete layer, and after the step of setting de-moulding the set concrete element.

The method may include the step of repairing an existing structure by placing the first wet concrete layer on an existing structure and the second wet concrete layer on the first wet concrete layer, and then setting to form a composite structure with the existing structure. The second concrete layer may comprise the AACM cement and may at least comprise one of a reinforcement structure and carbon fibres.

In accordance with a second aspect of the present invention there is provided a concrete element constructed in accordance with the method described to include at least two integrally formed layers of different concretes, wherein one layer of concrete includes an AACM cement, with the AACM concrete layer providing a protective lining or coating to the other layers.

The other layers may include at least one ordinary Portland cement (OPC) layer.

The AACM layer may include at least one of carbon fibres and a reinforcing structure.

In a preferred embodiment the AACM cement is a geopolymer cement. The concrete element may be a tunnel segment.

By way of example only specific embodiments of the invention will now be described with reference to the accompanying drawings, in which:

FIG. 3a is a table showing test results for a concrete element constructed in accordance with the present invention; and FIG. 3b is a graphical representation of the results shown in FIG. 3a.

Figure 1:
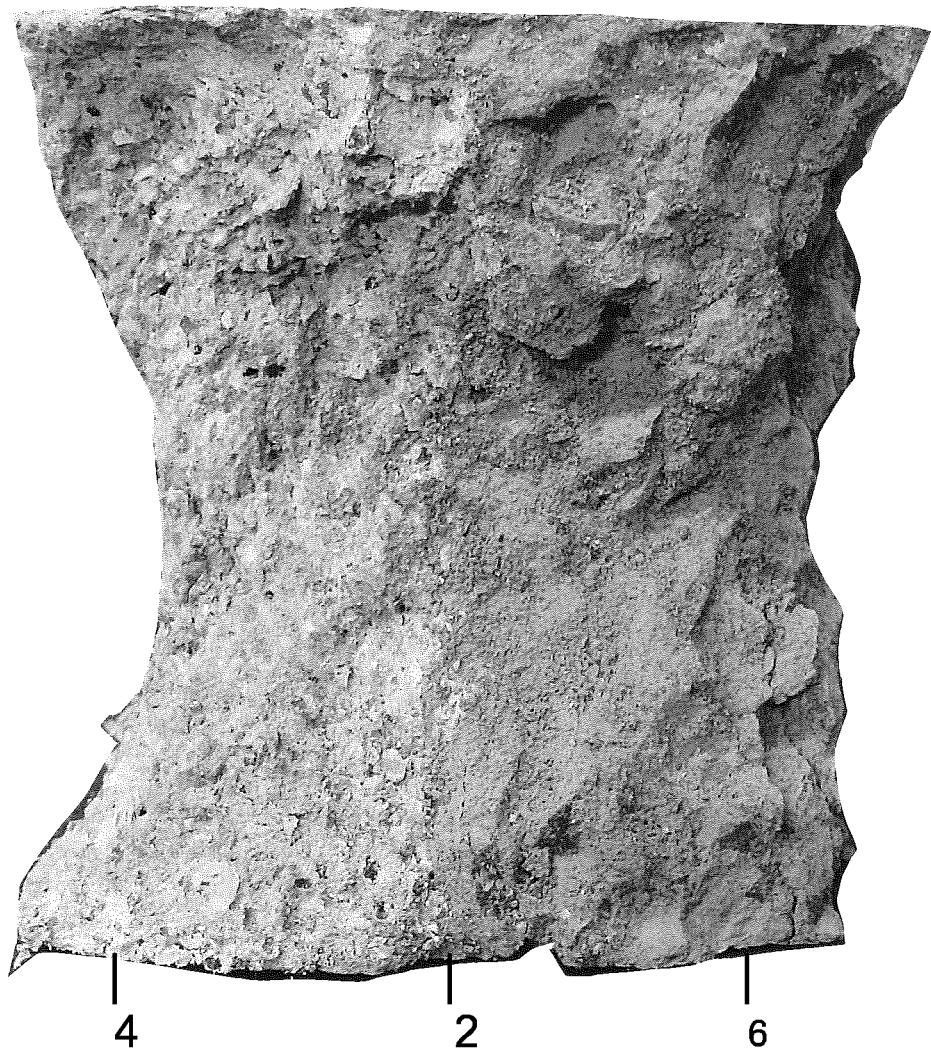
FIG. 1 shows a test cube after a crush test, which cube was made of a composite concrete structure made in accordance with the present invention.

In order to produce a standard precast concrete segment a wet concrete mix is poured into a mould and allowed to set before de-moulding. According to the present invention this standard method is adapted to produce a composite pre-cast concrete segment which can exhibit improved properties. To this end a first concrete mix is added wet to a mould to a required depth. This is followed by placement of a second wet concrete mix over the first wet concrete mix, whilst the first concrete mix is still wet. This is effectively a wet-on-wet application. The two concrete materials are then allowed to set together before de-moulding the finished concrete segment. By selecting two different concrete mixes a precast concrete structure can be produced with two integral layers.

In a preferred embodiment a layer of geopolymer concrete is integrally formed over a layer of OPC concrete, the geopolymer layer can then act as a topping or a liner to the OPC concrete when used for example as a tunnel segment. The mixture of the geopolymer cement layer can be preselected to provide the required protection properties, for example improved compressive strength, prevention of water ingress, prevention of corrosion required adhesion, and fire, chemical and mechanical resistance to the base OPC concrete layer.

It is to be understood that the component mixture of each concrete layer can be selected to be suitable for the required end use, as well as the thickness of each layer. The setting time or the length of time between pouring the first concrete wet layer and then the second concrete wet layer can also be selected to provide a required degree of preset of the first layer, before application of the second layer; to thereby adjust or optimise the bonding properties between the two layers. The bond between the two layers is a strong ionic bond, rather than covalent arising from the interaction of cations, such as sodium, calcium, silicon and aluminium with anions such as oxygen.

Tests have shown that a test cube formed using the above wet-on-wet moulding process, in which the test cube is crushed demonstrates that the bond remains in-tact and the test show high compressive strengths of 35 to 50 MPa on their 28 day test which meets structural requirements as a finished concrete product.

The composite concrete produced by the wet-on-wet moulding technique was tested in compliance with British standards relating to testing concrete at a UKAS Laboratory (United Kingdom Accreditation Service Laboratory).

Test methods:
Sampling of concrete carried out in accordance with BS EN 123501-1: 2009
Curing of samples was carried out in accordance with BS-EN 12390-2: 2009
Shape and dimension checks were carried out in accordance with BS EN 12390-1: 2012
Density of specimens was carried out in accordance with BS EN 12390-7: 2009 (water displacement method).
Compressive strength test was carried out in accordance with BS EN 12390-3: 2009.

A number of cubes from each of four different concrete mixes were tested, in accordance with the standard practice at 7 days and at 28 days.

The cubes of concrete produced for the test had a designated dimension of 100 mm$^3$ and were produced by placing a wet concrete in a cube shaped mould, setting the concrete and de-moulding the pre-cast concrete prior to testing.

Sample 1 Cubes

A standard OPC (C35 mix) topped by a geopolymer incorporating carbon fibres using the wet-on-wet process. Compressive strength testes after 27 days on the two cubes tested were 36.3 N/mm$^2$ and 39.4 N/mm$^2$. A cube crushed after the test can be seen in FIG. 1 in which the bond 2 between the two materials is clearly intact. OPC is denoted by reference 4, Geopolymer by reference 6.

Sample 2

A geopolymer concrete topped with a geopolymer concrete including carbon fibres using a wet-on-wet moulding process. In this instance the test results were 49 and 50.6 N/mm$^2$ respectively.

Sample 3

A geopolymer concrete the test results were 43.4 and 43.5 N/mm$^2$.

Sample 4

A geopolymer concrete including carbon fibres. The crush test results were 50.2 and 50.5 N/mm$^2$.

The results show that the wet-on-wet moulding technique for forming a composite concrete structural element produced produces a strong bond and high compressive strength with no loss of bond following comprehensive testing. A C35 concrete according to British Standard 8500-2 is required to reach a compressive strength of 30 newtons per square mm after 28 days, therefore the composite C35/geopolymer structure in accordance with the invention has an improved compressive strength whilst having the improved protective properties offered by the addition of the geopolymer layer.

In contrast a bond strength test carried out by Sheffield Hallam University on a sample of ordinary concrete bonded to geopolymer, i.e. the geopolymer layer was formed on the OPC concrete after it was set, showed a much poorer bond strength or adhesion to the OPC concrete of circa 3 MPa.

The following is an example of a mix design for an OPC mix and the so-called topping of geopolymer (GP) placed wet-on-wet and used to produce cubes for testing the properties of the composite material produced.

| A) OPC concrete (w/c ratio of 0.43): | |
|---|---|
| OPC cement | 5.00 kg |
| Water | 2.15 kg |
| Sand | 8.00 kg |
| Aggregate (20 mm) | 7.74 kg |
| Aggregate (10 mm) | 6.80 kg |
| Water reducing admixture | 15 g |
| B) Geopolymer concrete | |
| GP cement | 9.0 kg |
| Aggregate (10 mm) | 7.0 kg |
| Alkali activator solution | 0.75 kg |
| Retarder | 72 g |
| Shrinkage reducing admixture | 144 g |

The length of time to mix the ingredients of each concrete mix prior to pouring in the mould is standard with the intention to have each well mixed and wetted around the aggregate. A typical wait time before placing the layer of wet geopolymer concrete on to the wet OPC concrete layer is 1 hour, enabling some setting of the OPC concrete layer prior to placement of the wet geopolymer concrete layer. Typically the composite concrete structural element can be de-moulded after 24 hours.

Figure 2A:
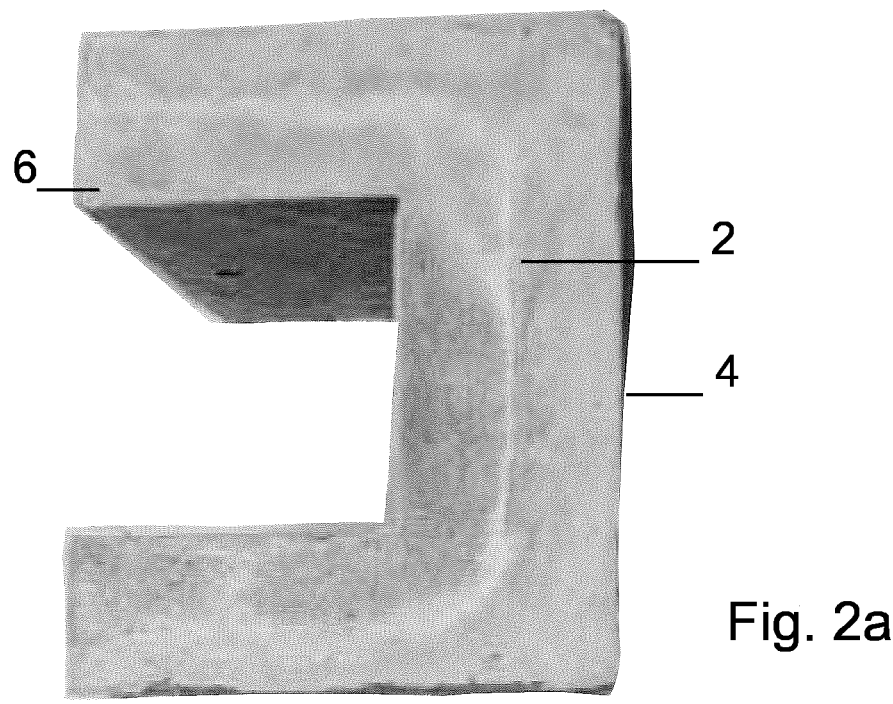
FIGS. 2a & 2b show photographs of a specimen formed with two layers of concrete as a lining layer of carbon fibre geopolymer inside an outer base layer of OPC.
Figure 2B:
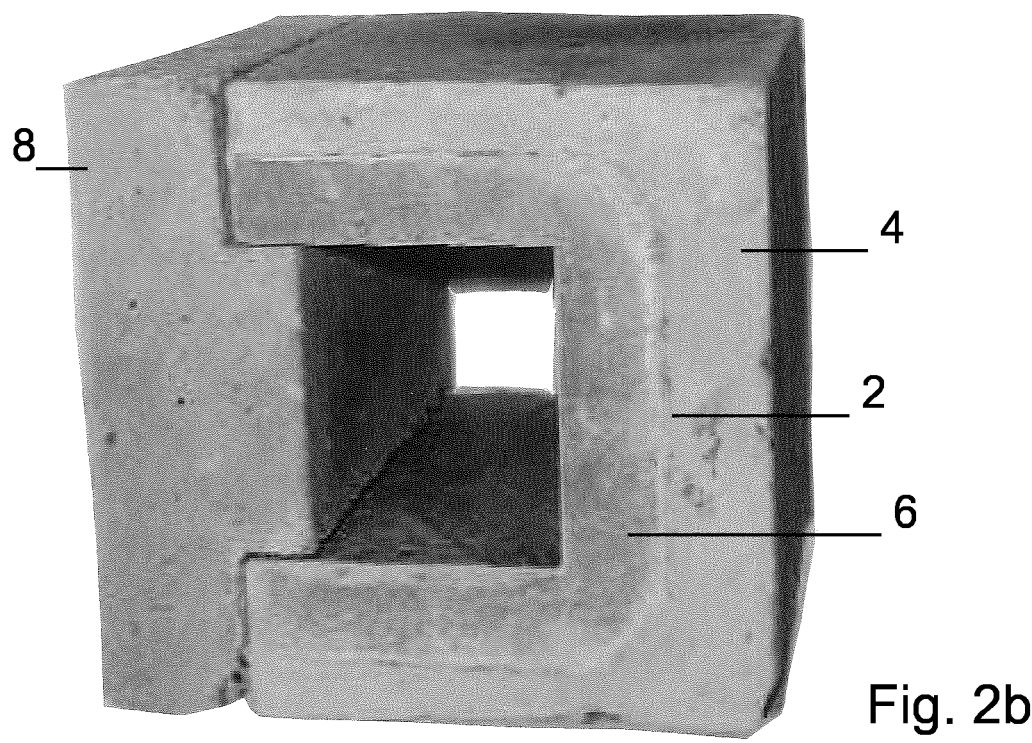

An example of a pre-cast structure in accordance with the invention is shown in FIGS. 2a and 2b. The pre-cast c-shaped structure has an inner layer lining 6 of geopolymer concrete and an outer base layer 4 of OPC concrete. The ionic bond 2 between the layers is clearly shown. In FIG. 2b the C-shaped structure is mounted to a further structure.

To produce a pre-cast tunnel segment the mould usually has a cavity with a curved shape, in such an application the wet layer of OPC cement is placed in the mould cavity first, and say the inner curved surface of the tunnel segment is produced by placing the wet layer of geopolymer concrete on the top thereof within the cavity, to say 100 mm deep, as the wet applications within the mould of the geopolymer (with or without carbon fibres). The set de-moulded tunnel segments can be assembled on site with a protective coating layer already present, obviating the need for the additional application of a lining on site.

Although a tunnel segment has been described produced in a curved mould, it is to be understood that the invention is not restricted to this application. The mould could have different shapes, for example flat or a beam mould to enable pre-casting of structural beams, slabs and columns or indeed non-structural pre-casting of cladding panels.

The wet-on-wet applications are an enhancement to the pre-cast unit, in that the pre-cast unit would host the technical features of fire, corrosion and chemical resistance; without the requirement for an additional lining or material placement to hardened materials in such applications, since it would be an integral feature. The AACM layer can incorporate a reinforcement structure and/or cathodic protection. The cathodic protection protecting a metallic reinforcement structure from corrosion when placed in the AACM layer or within the adjacent layer or both. The cathodic protection may include carbon fibres or the like.

The application of an integral geopolymer concrete layer on OPC concrete offers superior technical features when compared to OPC mixes on their own.

In a further application of the wet-on-wet application, the technique can also be used to repair breakout in concrete with the preparation, mixing and placement complying with European Standard EN1504 or the like for the repair and restoration of concrete structures. To this end a wet layer of OPC cement could be applied first and a layer of wet AACM layer applied on top of the wet OPC layer and then allowed to set. Carbon fibres could be added to the AACM concrete formulation to provide cathodic protection for a reinforced concrete and an improved tolerance to fire and chemicals for the existing structure.

This enables existing concrete slabs or elements for example, bridges and car park decks to be repaired by partial or full depth deck replacement. The method could for example also apply to walls and beams which may need extensive repair.

Figure 3B:
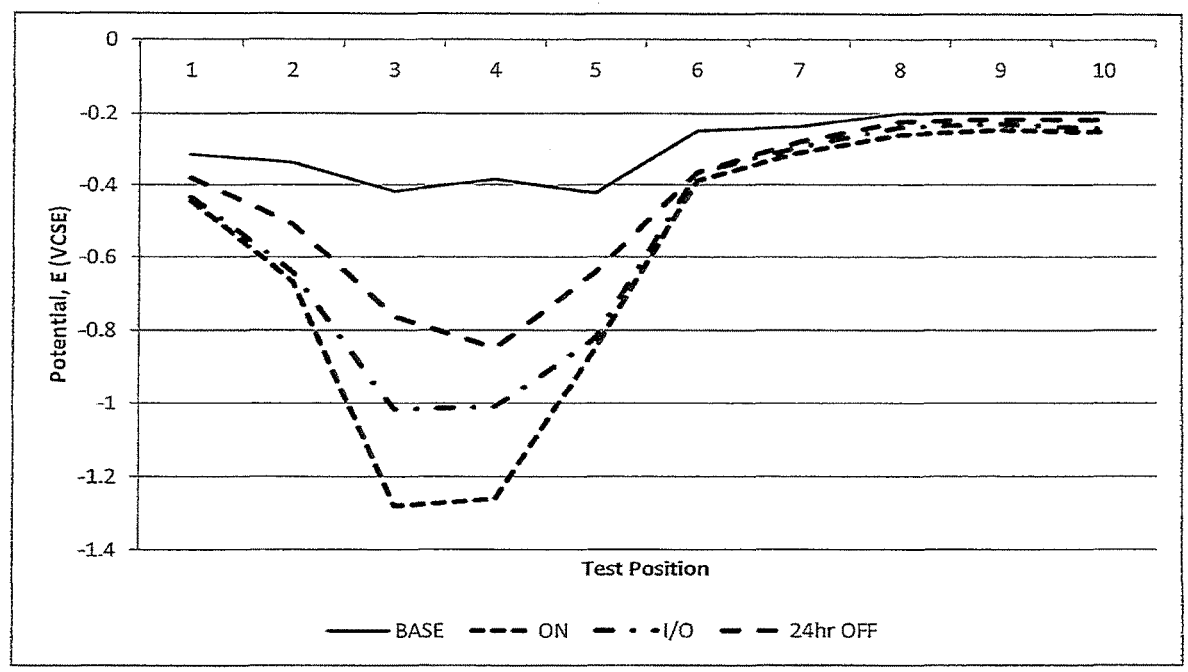

FIGS. 3a and 3b show the testing of a floor slab constructed using the described wet-on-wet method. The floor slab is a casting of the AACM/geopolymer as an anode mortar on top of an oPc mix. The casting was preformed wet-on-wet and after curing of the whole composite, it was tested pre and post energisation as an impressed current anode to protect the reinforcement steel embedded within the oPc layer. The oPc was 150 mm deep and the AACM/geopolymer anode layer was 50 mm deep. The whole installation was then covered by an epoxy flooring.

In FIGS. 3a and 3b "Lines" refers to a row of monitoring positions (windows) placed within the surface coating on the concrete slab that are interrogated from the surface using a reference electrode (half-cell) with the steel connecting to complete the potential measurement cell. There were 10 lines (1-10) in one direction and 6 (A-F) in the other direction to form a grid of measurements (10×6); the anode is placed in a 4×6 grid within the 10×6 larger test area. These data are for all 10 lines but at one grid position (D) as representative of the reaction of the anode and steel when activated. FIG. 3b shows the contour plots which show the behaviour in all states (BASE, ON, IO, OFF) for all 60 grid points per state. The lines are spaced at 500 mm. The anode is placed between lines 2 to 5.

FIG. 3a, the data table shows values in millivolts to a copper/copper sulfate reference electrode (mVCSE) whereas the graphical plot [FIG. 3b] is in volts to the same reference electrode hence the unit is stated as V(CSE).

The ISO EN 12696:2012 is the standard for the use of cathodic protection to reinforced concrete and has testing parameters based on corrosion potential measurements of embedded or surface half-cell testing. These data demonstrate compliance with that standard in that Base (unenergised) potentials are compared to energised potentials, that is measured OFF then the system is ON, then interrogated as an Instantaneous-OFF (IO) potential (interruption of the current momentarily—within 1-4 s) followed by switching the system OFF again for 24 hours and allowing the potentials to decay back to a new Base value. So the top plot is Base OFF becomes the one at the bottom when ON then IO before decay for 24 hours (which are the middle two plots). The values shown in from lines 2 to 5 coincide with the placement of the ARCM/geopolymer anode within the slab where the data shown for the other lines coincide with the existing concrete slab to demonstrate the "throwing power" of the anode current; the influence tails off as one moves away from the anode area but is still influential some 0.5-1.0 m from the anode. This is classical and successful behaviour of an ICCP (Impressed Current Cathodic Protection) anode in reinforced concrete.

This demonstration on the flooring slab replicates the intentions of precasting in that there is a lining (layer) placed wet-on-wet on new oPc that is then powered up on hardening to meet the requirements of the international standard.

Whilst a C35 is described which is a standard term for a 35 MPa concrete derived from an ordinary Portland cement mix, other concretes could be used for example, c10, c20, c30, c40, c50, c60, c80 and so on, where c is the concrete and the number is its compressive strength one is trying to achieve.

Whilst ordinary Porland cement has been described, it is to be understood that different types of concrete could be used including AACM cements.

Whilst geopolymer has been described the concrete could be made of a different type of AACM cement.

In this respect many variations are possible without departing from the scope of the invention.

The invention claimed is:

1. A method of construction of a concrete element, the method comprising:
    providing a wet first concrete layer;
    providing a wet second concrete layer on the wet first concrete layer;
    setting the first and second concrete layers to bond the first concrete layer to the second concrete layer to produce a composite concrete element, wherein at least one of the first and second concrete layers comprises an AACM concrete layer (Alkali-Activated Cementitious Material) and incorporating carbon fibres into the AACM concrete layer while the AACM concrete layer is wet, the carbon fibers being configured and arranged for use as an anode in impressed current cathodic protection (ICCP) of the concrete element.

2. A method according to claim 1, wherein the first and second concrete layers comprise different concretes.

3. A method according to claim 1, wherein the AACM concrete layer includes at least one geopolymer cement.

4. A method according to claim 1, wherein the first and second concrete layers are integrally joined by an ionic bond.

5. A method according to claim 1, wherein the AACM concrete layer forms at least one of a coating and a lining to another concrete layer of the first and second concrete layers.

6. A method according to claim 1, wherein the AACM concrete layer forms at least one of a coating and a lining of another concrete layer of the first and second concrete layers, the other concrete layer comprising an ordinary Portland cement (OPC).

7. A method according to claim 1, the method further comprising: adding an additional reinforcement structure to at least one of the wet first and second concrete layers.

8. A method according to claim 7, wherein the additional reinforcement structure is added to the AACM concrete layer.

9. A method according to claim 1, the method further comprising preselecting the ingredients of at least one concrete mix to preselect characteristics of the concrete element once finished, wherein characteristics of the AACM concrete layer are preselected to provide the AACM concrete layer with a desired degree of at least one of: resistance to water ingress, fire resistance, chemical resistance, salt ingress resistance, and mechanical resistance.

10. A method according to claim 1, the method further comprising:

adjusting at least one of: the time between adding the second concrete layer to the first concrete layer, and a time and conditions enabling the wet first and second concrete layers to set and bond.

11. A method according to claim 1, wherein the concrete element is precast using a mould;

wherein providing the wet first and second concrete layers includes pouring the wet first concrete layer into the mould, pouring the wet second concrete layer into the mould on top of the wet first concrete layer;

and wherein the method further comprises de-moulding the set concrete element after setting the first and second concrete layers.

12. A method according to claim 1, the method further comprising:

placing the wet first concrete layer on an existing structure and the wet second concrete layer on the wet first concrete layer, and then setting the wet first and second concrete layers to form a composite structure with the existing structure.

13. A method according to claim 1, the method further comprising placing the wet first concrete layer on an existing structure and the wet second concrete layer on the wet first concrete layer, and then setting the first and second concrete layers to form a composite structure with the existing structure;

wherein the second concrete layer comprises the AACM concrete layer.

14. A method according to claim 1, the method further comprising:

repairing an existing structure by placing the wet first concrete layer on an existing structure and the wet second concrete layer on the wet first concrete layer, and then setting the first and second concrete layers to form a composite structure with the existing structure;

wherein the second concrete layer comprises the AACM concrete layer; and wherein the AACM concrete layer further comprises an additional reinforcement structure.

15. A method according to claim 1, the method further comprising arranging the carbon fibres so that at least a portion of the carbon fibres is electrically accessible from an exterior of the composite concrete element.

16. A method of construction of a concrete element, the method comprising:

providing a first wet concrete layer;

providing a second wet concrete layer on the first wet concrete layer;

and setting the first and second concrete layers to bond the first layer to the second concrete layer to produce a composite concrete element;

wherein one layer of the first and second concrete layers comprises an AACM concrete layer (Alkali-Activated Cementitious Material) and another layer of the first and second concrete layer comprises an ordinary Portland cement (OPC); and wherein the AACM concrete layer forms at least one of a coating and a lining of the other layer.

17. A method of construction of a concrete element, the method comprising:

providing a wet first concrete layer on an existing structure;

providing a wet second concrete layer on the wet first concrete layer;

and setting the first and second concrete layers to bond the first concrete layer to the second concrete layer to produce a composite concrete element with the existing structure, wherein at least one of the first and second concrete layers comprises an AACM concrete layer (Alkali-Activated Cementitious Material).

18. A method according to claim 17, wherein the second concrete layer comprises the AACM concrete layer.

19. A method according to claim 17, wherein the second concrete layer comprises the AACM concrete layer; and wherein the AACM concrete layer further comprises at least one of a reinforcement structure and carbon fibres.

* * * * *